(No Model.)

R. NIELSON.
GLASS MOSAIC FOR DECORATING ROOMS AND OTHER PURPOSES.

No. 313,099. Patented Mar. 3, 1885.

WITNESSES:
Peter Sims.
B. Hartman.

INVENTOR
R. Nielson
BY
Chas Wahlers
ATTORNEY

UNITED STATES PATENT OFFICE.

RUDOLPH NIELSON, OF NEW YORK, N. Y.

GLASS MOSAIC FOR DECORATING ROOMS AND OTHER PURPOSES.

SPECIFICATION forming part of Letters Patent No. 313,099, dated March 3, 1885.

Application filed April 29, 1884. (No specimens.)

*To all whom it may concern:*

Be it known that I, RUDOLPH NIELSON, a citizen of the United Sates, residing at New York, in the county of New York and State of New York, have invented certain new and useful Improvements in Glass Mosaics, of which the following is a specification, reference being had therein to the accompanying drawings.

This invention relates to glass mosaics for decorating rooms and other purposes; and it consists in the novel features of construction, hereinafter described, whereby an article of superior utility is obtained at a low cost.

Figure 1:
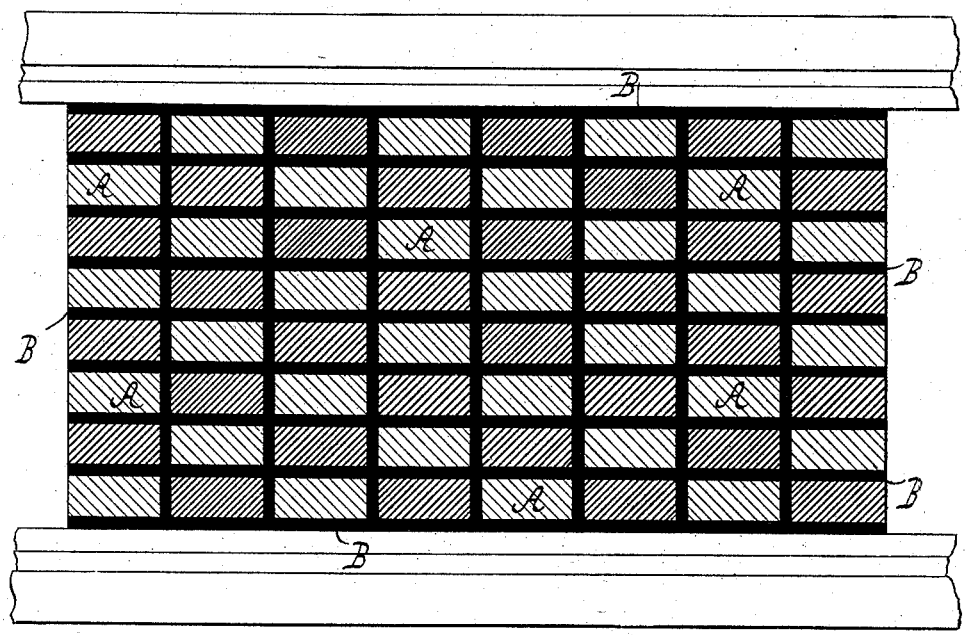
Figure 2:

In the accompanying drawings, Figure 1 is a face view of a mosaic made according to my invention. Fig. 2 is a cross-section thereof.

Similar letters indicate similar parts.

In carrying out my invention I take pieces A of glass, of the proper size and shape to produce the desired pattern, and cement such glass pieces to a back, C, in proper relation to each other by means of glue or other proper substance, leaving spaces or interstices B between the glass pieces. I then fill these interstices with a plastic material—such as plaster-of-paris—and then coat such material with a suitable color, when the article is ready for use.

The plastic material may be introduced into the interstices B by spreading it over the assembled mass of glass pieces A, and working it into the interstices, as with a brush, the surplus material being subsequently removed, while the color for the plastic material may be spread in a similar manner, as by means of a brush.

The color used to coat the plastic material may be a water-color or an oil-color, and when a water-color is used a small quantity of turpentine may be mixed with it to promote its adhesiveness, or the turpentine may be mixed with the plastic material.

It will be noticed that the glass pieces A have the appearance of being embedded in the plastic material, as in an ordinary mosaic, while by cementing the glass pieces to the back and then filling the interstices an article of any desired pattern can be produced in a rapid and economical manner.

Previous to cementing the glass pieces A to the back, I usually stain or otherwise ornament them on the rear surface, as with an oil-color or bronze-powder, which being visible through the glass produces a very beautiful effect.

In the example shown the back C is a piece of fibrous or textile material, which being flexible readily adapts itself to the wall or other surface to which the mosaic is to be applied, and being absorbent effectually retains the adhesive substance used for cementing the glass pieces to the back, and for cementing the back with its attachments to the desired surface.

Ordinary paste—such as used by paperhangers—will answer the purpose of cementing the back C to a wall.

I am aware that pieces of glass have heretofore been embedded in cement to form a mosaic panel, and I do not claim such as my invention, one important feature of which is the flexible and absorbent backing of fibrous or textile material for supporting the glass pieces, &c., and another the introduction of the filling in a plastic state between the glass pieces after they have been united to the backing.

What I claim as my invention is—

1. The within-described process of making glass mosaics, which consists in cementing pieces of glass to a suitable back, and then filling the interstices between such glass pieces with a plastic material, substantially as described.

2. As an article of manufacture, a glass mosaic consisting of the flexible and absorbent backing of fibrous or texile material, the glass pieces united directly to the backing, and the filling of plastic material between the glass pieces, substantially as shown and described.

In testimony whereof I affix my signature in presence of two witnesses.

RUDOLPH NIELSON.

Witnesses:
 E. F. EDWINS,
 M. E. BENSON.